Feb. 13, 1962     A. SEIZINGER     3,021,158
ADJUSTING STRUCTURE FOR ENLARGERS OR THE LIKE
Filed Jan. 21, 1960     2 Sheets-Sheet 1
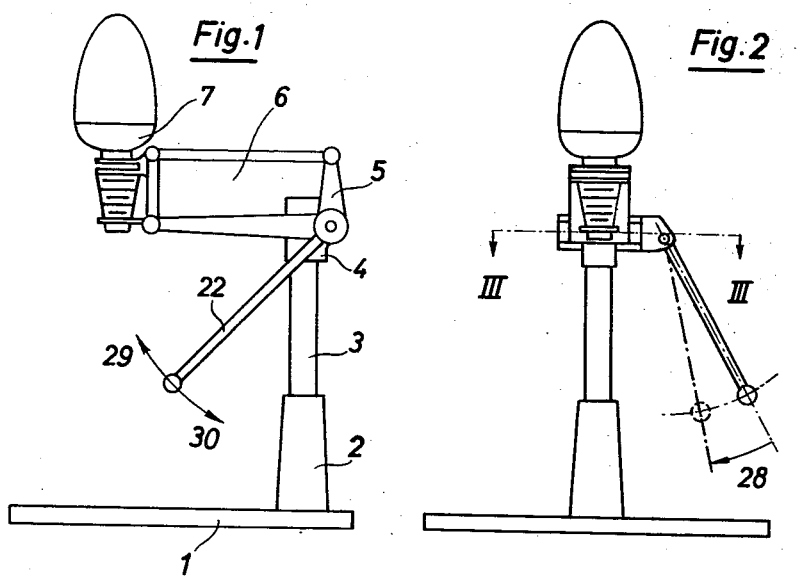
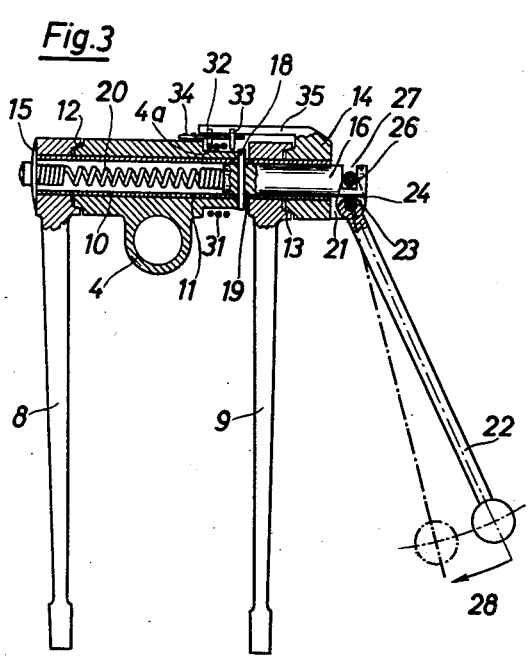
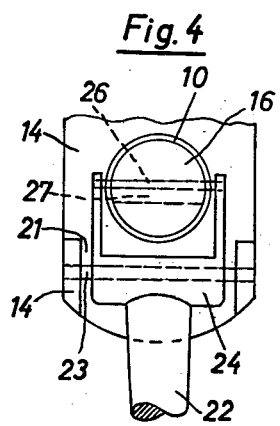
INVENTOR.
AUGUST SEIZINGER Feb. 13, 1962  A. SEIZINGER  3,021,158
ADJUSTING STRUCTURE FOR ENLARGERS OR THE LIKE
Filed Jan. 21, 1960  2 Sheets-Sheet 2

INVENTOR.
AUGUST SEIZINGER
BY Michael S. Striker

United States Patent Office 3,021,158
Patented Feb. 13, 1962

3,021,158
ADJUSTING STRUCTURE FOR ENLARGERS OR THE LIKE
August Seizinger, Munich, Germany, assignor to Agfa Aktiengesellschaft, Leverkusen-Bayerwerk, Germany
Filed Jan. 21, 1960, Ser. No. 3,900
Claims priority, application Germany Jan. 24, 1959
11 Claims. (Cl. 287—14)

The present invention relates to adjusting devices of the type used, for example, to adjust the position of an enlarger head of an enlarger.

In adjusting devices of this type it is important to be able to rapidly and easily carry out the desired adjustment in a precise manner. At the present time the known adjusting devices do not permit the best possible manner of adjustment to be carried out since very often the adjusting devices are extremely uncomfortable to operate and also quite often have very poor mechanical advantages so that the operator must exert considerable force to effect the desired adjustment.

It is accordingly one of the objects of the present invention to provide an adjusting assembly which will enable a device such as an enlarger head to be adjusted quickly and easily in the most precise manner and also in a manner which is of the utmost convenience with respect to the operator.

It is also an object of the present invention to provide an adjusting device which does not require the operator to exert any particularly great force in order to effect adjustment irrespective of the particular position to which the device such as the enlarger head or the like is adjusted.

Another object of the present invention is to provide an adjusting device of the above type which requires only a single manually engageable member to be manipulated by the operator in order to carry out the entire adjustment.

An additional object of the present invention is to provide an adjusting assembly of the above type wherein this single manually engageable adjusting member automatically returns to a given predetermined position where it is easily accessible to the operator irrespective of the position to which the adjusted device has been moved. This latter arrangement is particularly desirable with photographic equipment such as enlargers since in this way the operating handle of the device, for example, will always remain in the same position and thus when working in the dark room the operator need not grope around in order to determine where the operating handle is, since it will always be at the same location.

With the above objects in view, the invention includes, in an adjusting assembly for adjusting a device such as an enlarger head or the like, a support means and a linkage means movably carried by the support means. A releasable holding means cooperates with the support means and linkage means for holding the latter in a given position with respect to the support means when the holding means is in an operative, non-released position. A clutch means is also provided, and in accordance with the invention a manually operable means is provided which is acted on by the clutch means for connecting the manually operable means to the linkage means when the clutch means is engaged. The manually operable means, when it is manipulated to effect engagement of the clutch means, causes in addition the disengagement or release of the holding means so that in this way when the clutch means is engaged the linkage means is released by the disengagement of the holding means so as to be freely adjustable with respect to the support means and by manipulation of the manually operable means, while when the latter is released the holding means again becomes engaged so as to hold the linkage means in the position to which it has been adjusted with respect to the support means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic side elevation of the adjusting assembly of the invention shown in conjunction with an enlarger;

FIG. 2 is an end view of the structure of FIG. 1 as seen from the left of FIG. 1;

FIG. 3 is a sectional view on an enlarged scale, as compared to FIGS. 1 and 2, taken along line III—III of FIG. 2 in the direction of the arrows;

FIG. 4 is an end view fragmentarily illustrating the structure at the right end of FIG. 3.

Figure 3A:
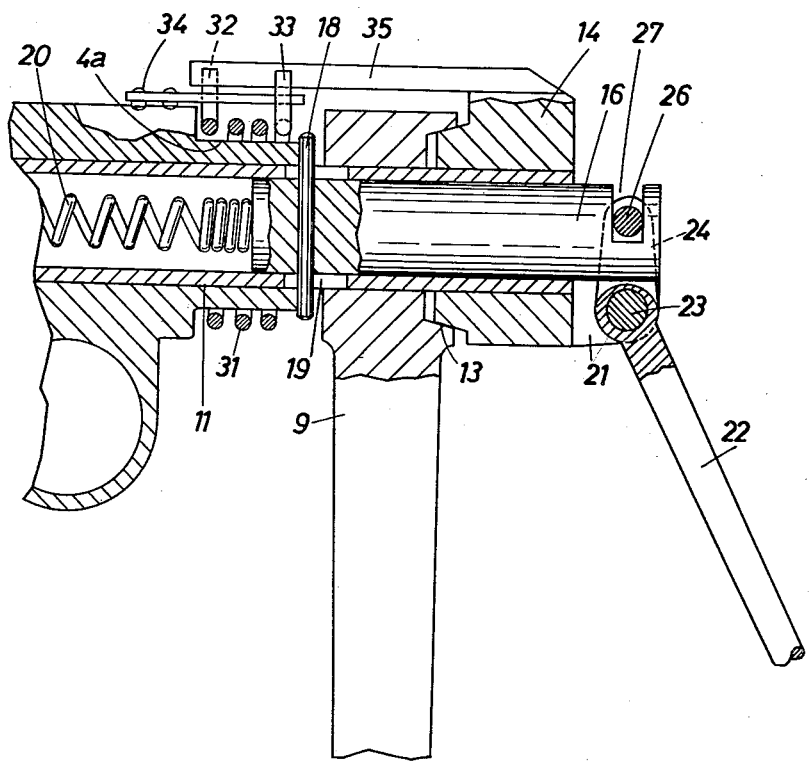
FIG. 3a is an enlarged view of the structure shown at the upper right of FIG. 3.

Referring now to FIGS. 1 and 2, the structure illustrated therein is an enlarger which includes a base plate 1 which carries a standard 2 from which a post 3 extends upwardly. A support member 4 is fixed to the post 3 adjacent the upper end thereof, although the support member 4 may also, if desired, be fixed in a preselected adjusted position along the post 3. This support member 4 is illustrated in section in FIG. 3 and forms the support means for the adjusting assembly of the invention. An arm 5 extends vertically up from the support member 4 and is fixed to the latter. This arm 5 forms one of the members of one parallelogram linkage which is visible in FIG. 1. Actually there are a pair of identical parallelogram linkages located one behind the other and indicated by reference character 6 in FIG. 1, both of these parallelogram linkages including an arm 5, as illustrated in FIG. 1. The arm of each parallelogram linkage which is parallel to the arm 5 is connected with the enlarger head 7, and with the assembly of the invention it is possible to adjust the elevation of the enlarger head 7 with respect to the base plate 1 so as to bring about the desired enlargement in a well known manner. FIG. 3 shows the pair of lower arms 8 and 9 of the pair of parallelogram linkages 6. The weight of the enlarger head 7 can be counterbalanced in a known way by any suitable counterweights or springs. This latter structure is not illustrated since it does not form part of the present invention.

Referring now to FIG. 3 which shows the details of the structure of the invention, it will be seen that the support means or support member 4 is formed with an elongated horizontal bore 11 passing therethrough, and the elements 8 and 9 form part of a linkage means which includes the tubular member 10 which extends slidably through the bore 11 and well beyond the opposite end faces of the support member 4, as illustrated in FIG. 3. Thus, the tubular member 10 forms the adjustable member which is to be angularly adjusted with respect to the support means 4 so as to regulate the elevation of the enlarger head 7, although it is apparent that the structure of the invention can be used to adjust other devices also.

A holding means 12 is provided for releasably holding the adjustable tubular member 10 in its adjusted position with respect to the support means 4, and this holding means 12 is formed in part by a frustoconical surface formed on the left end face of the support means 4, as viewed in FIG. 3, as well as by a mating frustoconical surface formed on the right end face of the hub of the lever 8 which surrounds and is fixed to the tubular member 10. Thus, because this hub of the lever 8 is fixed to the tubular member 10 it forms part of the holding means 12 which serves to releasably hold the tubular member 10 in the adjusted angular position with respect to the support means 4. The frictional engagement between the frustoconical surfaces which are nested one in the other serve to hold the holding means in an operative, engaged position.

The lever 9 which forms part of the parallelogram linkage visible in FIG. 1 also has a hub portion surrounding and fixed to the tubular member 10. The right face of this hub portion of the lever 9, as viewed in FIGS. 3 and 3a, forms one of the clutch members of a clutch means 13. An adjusting element 14 is freely slidable on the tubular member 10 at the right end portion of the latter which is located well beyond the right end face of the support means 4, and this adjusting element 14 can turn as well as shift axially with respect to the tubular member 10. The left end face of the adjusting element 14 forms the other clutch member of the clutch means 13 so that when the frustoconical surfaces of the clutch member 13 press against each other the adjusting element 14 is fixed to the tubular member 10 through the clutch means 13.

A spring means is provided for maintaining the holding means 12 engaged when the parts are not manipulated by the operator, and this spring means includes a spring member 16 in the form of a pin extending slidably into the interior of the tubular member 10 from the right end thereof, as viewed in FIGS. 3 and 3a, this pin 16 extending freely beyond the right end of the tubular member 10, as shown in FIGS. 3 and 3a. The spring means also includes a coil spring 20 fixed at its right end, as viewed in FIG. 3, to the left end of pin 16, and this spring 20 is fixed at its opposite end to a cover member 15 which covers the left end of the tubular member 10 and which engages the left end face of the hub portion of the lever 8. The tubular member 10 is formed in the region of the right end face of the support member 4 with a pair of diametrically opposed axially extending slots 19 (shown most clearly in FIG. 3a), and a cross pin 18 is fixed to the pin 16 and extends through the latter as well as through the pair of diametrically opposed coextensive longitudinal slots 19 of the tubular member 10. In the position of the parts shown in FIGS. 3 and 3a the pin 18 is spaced from the ends of both of the slots 19. Thus, with the structure as shown in FIGS. 3 and 3a the spring 20 urges the stop member or cross pin 18 against the right end face of the support means 4, and this spring 20 also urges the entire tubular member 10 to the right through the action of the cover 15 so that in this way the cover 15 and stop member 18 are urged toward each other and the holding means 12 is maintained engaged.

Referring now to FIG. 4 as well as to FIGS. 3 and 3a, it will be seen that the adjusting element 14 is formed in its right end portion, as viewed in FIGS. 3 and 3a, with an axially extending cutout 21 which receives the bifurcated end portion 24 of a lever 22 which forms the single manually operable means of the structure of the invention. A pivot pin 23 is carried by the element 14 extending across the cutout 21 thereof and this pivot pin 23 extends through a bore of the portion 24 of the lever 22 so as to support the lever 22 for turning movement with respect to element 14 about an axis perpendicular to the axis of the bore 11. The pin 16 is received between the bifurcations of the portion 24 of the lever 22, and the pin 16 is formed with a notch 27 extending transversely through the pin 16. A pin 26 is fixedly carried by the bifurcations of the portion 24 of the lever 22, this pin 26 extending through the notch 27, so that in this way a means is provided for connecting the lever 22 to the pin or spring member 16. As is apparent from FIG. 4 there is considerable clearance between the pin 26 and the base of the notch 27 so that the lever 22 together with the element 14 can turn around the axis of the pin 16 through a considerable angle for a purpose described below.

Referring now to FIG. 3a, it will be seen that as a result of the connection of the lever 22 to the element 14 through the pin 23, this lever 22 is on the one hand turnable with respect to the element 14 and is on the other hand turnable together with the element 14 around the axis of the tube 10. When the operator shifts the lever 22 in the direction of the arrow 28 of FIG. 3, since the spring 20 maintains the stop member 18 against the stationary member 4, the pin 16 will remain stationary and the pin 26 in cooperation with the notch 27 will form a fulcrum for the lever 22 so that the turning of the latter in the direction of the arrow 28 will cause the pin 23 together with the element 14 to shift to the left, as viewed in FIG. 3, and since the tube 10 remains substantially stationary at this time the result is that element 14 will be pushed against the hub of the lever 9 and the clutch 13 will become engaged. During the continued turning of the lever 22 in the direction of the arrow 28 of FIG. 3, the holding means 12 and clutch means 13 will remain engaged. This will of course result in tensioning of the spring 20 beyond the tension thereof shown in FIG. 3, whereby the cross pin 18 is shifted to the right in its slots 19 and lifted from the right end face of the support means 4, and as a result pressure is eliminated from the holding means 12. As a result the turning of the lever 22 in the direction of the arrow 28 will not only engage the clutch 13 it will also disengage the holding means 12 so that now the operator can turn the lever 22 either in the direction of the arrow 29 or in the direction of the arrow 30 in FIG. 1 to act through the parallelogram linkages 6 on the enlarger head so as to readjust the position of the latter. As soon as the new position of the enlarger head is reached, the operator need only permit the lever 22 to turn in the direction opposite from the arrow 28 of FIG. 3. The spring 20 will automatically contract when it is no longer tensioned by the force of the operator acting on the lever 22, and thus pin 16 will be shifted to the left (as viewed in FIGS. 3 and 3a) and cross pin 18 will engage the right end face of the support means 4, as viewed in FIG. 3, whereby pressure is applied to holding means 12 which automatically engages so that the enlarger head will remain in the position to which it has been adjusted. Pin 26 also participates in this movement of the pin or spring member 16 so that as a result the lever 22 returns to the solid line position thereof indicated in FIG. 3. As soon as cross pin 18 arrives the right end face of support means 4 pressure is eliminated from clutch 13. Of course, as a result of the use of frustoconical surfaces for the clutch means 13 this clutch is disengaged whenever the operator does not apply pressure to the member 14 urging the latter against the hub of the element 9, so that the clutch 13 is now disengaged, and actually in this position of the parts the entire element 14 together with the lever 22 is free to turn around the axis of the pin 16 within the limits of freedom provided by the clearance between the pin 26 and the base of the notch 27.

The element 14 has an extension 35 connected to an end 33 of the spring 31 which is coiled around the right end portion of the support means 4, as viewed in FIG. 3, and the other end 32 of the spring 31 is connected to a bracket 34 which is fixed to the support means 4. As a result this spring 31 acts through the extension 35 of element 14 on the latter to always return the element 14 to a predetermined angular position with respect to the support means 4, irrespective of the position to which the member 10 has been adjusted, and while this member 10 is held in the adjusted position by the engaged holding means 12 the adjusting element 14 is turned with respect to the tubular member 10, the clutch 13 being disengaged, to the angular position determined by the spring 31, and this will of course always locate the lever 22 in a predetermined angular position with respect to the axis of the tube 10 irrespective of the adjusted angular position of the latter. The position of the bracket 34 on the support means 4 may be adjusted in any known way so that it is possible in this way to adjust the position of the lever 22 with respect to the axis of the tube 10 to that location which is most convenient for the operator, and since the lever 22 will always automatically return to this position after the holding clutch means 12 is engaged, the lever 22 is always accessible to the operator in the same position irrespective of the particular angular position of the tubular member 10.

Of course, the structure of the invention shown particularly in FIGS. 3 and 4 is illustrated in FIGS. 1 and 2 in connection with an enlarger head only by way of example. The structure of the invention has many different applications. For example, the member 10 instead of being connected to a parallelogram linkage may have a free end portion connected to a pinion which is in turn connected to a rack to shift the latter so as to adjust any desired type of device. Also, if desired, a portion of the member 10 may be threaded into an element which is to be adjusted by the cooperation of the threads of the element 10 with the threads of another element to be adjusted. Furthermore, it should be noted that the extent of adjustment is not necessarily limited to the extent to which the operator can turn the lever 22. For example, the device which is to be adjusted may be connected to the member 10 through a suitable ratchet arrangement so that the lever 22 may be turned in one direction to effect adjustment and will return freely while turning in the opposite direction so that it may again engage the ratchet to continue the adjusting movement when the lever 22 is again turned in the same direction. All of these possibilities are capable of incorporating the structure of the invention. It will be noted from FIG. 3 that the structure of the invention is extremely compact since it is included almost entirely in the immediate vicinity of the axis of the bore 11.

It will be understood that each of the elements described above, or two or more together, may also find a useful application in other types of adjusting devices differing from the types described above.

While the invention has been illustrated and described as embodied in adjusting devices for enlarger heads or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an assembly for adjusting the position of an article such as an enlarger head or the like, in combination, support means; linkage means movably carried by said support means; holding means having engaged and disengaged conditions and cooperating with said linkage means and said support means for holding said linkage means in a given position with respect to said support means when said holding means is in its engaged condition; clutch means having engaged and disengaged conditions and cooperating with said linkage means; and a single manually operable means operatively connected with said clutch means and holding means and movable from a rest to an operating position for placing said holding means in its disengaged condition and simultaneously placing said clutch means in its engaged condition, said clutch means in its engaged condition cooperating with said manually operable means and said linkage means for connecting said manually operable means to said linkage means so that said single manually operable means may then be manipulated to change and thus readjust the position of said linkage means, said manually operable means being movable from said operating to said rest position for placing said holding means in its engaged condition and said clutch means in its disengaged condition so that when said manually operable means is returned to said rest position thereof said linkage means will be held by said holding means in the position with respect to said support means to which it has been adjusted by said manually operable means.

2. In an assembly for adjusting the position of an article such as an enlarger head or the like, in combination, support means; linkage means movably carried by said support means; holding means having engaged and disengaged conditions and cooperating with said linkage means and said support means for maintaining said linkage means in a given position with respect to said support means when said holding means is in its engaged condition; clutch means having engaged and disengaged conditions and cooperating with said linkage means; and a single manually operable means operatively connected with said clutch means and holding means and movable from a rest to an operating position for placing said holding means in its disengaged condition and simultaneously placing said clutch means in its engaged condition, said clutch means in its engaged condition cooperating with said manually operable means and said linkage means for connecting said manually operable means to said linkage means so that said single manually operable means may then be manipulated to change and thus readjust the position of said linkage means, said manually operable means being movable from said operating to said rest position again placing said holding means in its engaged condition and said clutch means in its disengaged condition so that when said manually operable means is returned to said rest position thereof said linkage means will be held by said holding means in the position with respect to said support means to which it has been adjusted by said manually operable means, said support means supporting manually operable means for free movement with respect to said support means and said linkage means when said holding means is engaged.

3. In an assembly for adjusting the position of an article such as an enlarger head or the like, in combination, support means; linkage means movably carried by said support means; holding means having engaged and disengaged conditions and cooperating with said linkage means and said support means for maintaining said linkage means in a given position with respect to said support means when said holding means is in its engaged condition; clutch means having engaged and disengaged conditions and cooperating with said linkage means; a single manually operable means operatively connected with said clutch means and holding means and movable from a rest to an operating position for placing said holding means in its disengaged condition and simultaneously placing said clutch means in its engaged condition, said clutch means in its engaged condition cooperating with said manually operable means and said linkage means for connecting said manually operable means to said linkage means so that said single manually operable means may then be manipulated to change and thus readjust the position of said linkage means, said manually operable means being movable from said operating to said rest position for placing said holding means in its engaged condition and said clutch means in its disengaged condition so that when said manually operable means is returned to said rest position thereof said linkage means will be held by said holding means in the position with respect to said support means to which it has been adjusted by said manually operable means, said support means supporting manually operable means for free movement with respect to said support means and said linkage means when said holding means is in its engaged condition; and spring means operatively connected to said manually operable means for returning the latter, when said holding means is in its engaged condition to a predetermined rest position entirely independent of the position to which said linkage means has been adjusted.

4. In an assembly for adjusting the position of an enlarger head or the like, in combination, support means; an elongated member turnably carried by said support means for rotation around a given axis; holding means having engaged and disengaged conditions and cooperating with said member and support means for maintaining said member, when said holding means is in its engaged condition in a given position; an adjusting element carried by said member for free movement with respect thereto; clutch means cooperating with said adjusting element and said member for fixing said adjusting element to said member when said clutch means is engaged; and a single manually operable lever means turnably carried by said element for rotation around an axis extending across the axis of turning of said member and operatively connected to said member for engaging said clutch means while placing said holding means in its disengaged condition for the purpose of resetting said member with respect to said support means, and for disengaging said clutch means while placing said holding means in its engaged condition so that said element and lever means can be moved with respect to said member to any desired position while said member remains as a result of the placing of said holding means in its engaged condition in the adjusted position with respect to said support means.

5. In an assembly for adjusting the position of an enlarger head or the like, in combination, support means; an elongated member having a longitudinal axis and supported for rotation about said axis by said support means; holding means having engaged and disengaged conditions and cooperating in its engaged condition with said support means and member for maintaining the latter in an adjusted angular position; spring means cooperating with said support means and said member for maintaining said holding means in its engaged condition; an adjusting element freely turnable and axially movable on said member; clutch means cooperating with said member and said element for fixing said member and element to each other when said clutch means is engaged; a lever turnably carried by said element for turning movement about an axis extending across the axis of turning of said member; and means connecting said lever to said spring means for placing, during turning of said lever with respect to said element disengagement of said holding means in its disengaged condition and for engaging said clutch means so that after said turning of said lever and engagement of said clutch means said member can be angularly adjusted by turning of said lever with said element and said member about the axis of turning of the latter.

6. In an assembly for adjusting the position of an enlarger head or the like, in combination, a stationary support member formed with an elongated bore passing therethrough; an elongated adjustable member extending through said bore of said support member, said adjustable member being freely turnable around the axis of said bore as well as axially shiftable along said axis; holding means having engaged and disengaged conditions and cooperating in its engaged condition with said support member and said adjustable member for maintaining said adjustable member in a given position with respect to said support member; a spring member engaging said support member; spring means extending between said spring member and said adjustable member for urging said spring member against said support member and for urging said adjustable member in a given direction along said axis of said bore for placing said holding means in its engaged condition so that said spring means acts on said holding means to maintain the latter in its engaged condition for holding said adjustable member in its adjusted position with respect to said support member; an adjusting element freely turnable on and axially shiftable with respect to said adjustable member; clutch means cooperating with said adjustable member and said adjusting element for maintaining the latter in a given position with respect to said adjustable member when said clutch means is engaged and for releasing said adjustable element for free movement with respect to said adjustable member when said clutch means is disengaged; a lever turnably carried by said adjusting element for turning movement with respect to said adjusting element about an axis perpendicular to the axis of said bore; and means connecting said lever to said spring member for engaging upon turning movement of said lever with respect to said element, said clutch means and for acting on said spring member to disengage the latter from said support member and for placing said holding means in its disengaged condition.

7. In an assembly for adjusting the position of an enlarger head or the like, in combination, a stationary support member formed with an elongated bore passing therethrough; an elongated adjustable member extending through said bore of said support member, said adjustable member being freely turnable around the axis of said bore as well as axially shiftable along said axis; holding means having engaged and disengaged conditions and cooperating in its engaged condition with said support member and said adjustable member for maintaining said adjustable member in a given position with respect to said support member; a spring member engaging said support member; spring means extending between said spring member and said adjustable member for urging said spring member against said support member and for urging said adjustable member in a given direction along said axis of said bore for placing said holding means in its engaged condition so that said spring means acts on said holding means to maintain the latter in its engaged condition for holding said adjustable member in its adjusted position with respect to said support member; an adjusting element freely turnable on and axially shiftable with respect to said adjustable member; clutch means cooperating with said adjustable member and said adjusting element for maintaining the latter in a given position with respect to said adjustable member when said clutch means is engaged and for releasing said adjustable element for free movement with respect to said adjustable member when said second clutch means is disengaged; a lever turnably carried by said adjusting element for turning movement with respect to said adjusting element about an axis perpendicular to the axis of said bore; means connecting said lever to said spring member for engaging, upon turning movement of said lever with respect to said element, said clutch means and for acting on said spring member to disengage the latter from said support member and for placing said holding means in its disengaged condition; and a pair of arms fixed to and extending radially from said adjustable member and respectively forming parts of a pair of parallelogram linkages, said arms respectively having hub portions surrounding said adjustable member and respectively forming parts of said holding and clutch means.

8. In an assembly for adjusting the position of an enlarger head or the like, in combination, a stationary support member formed with an elongated bore passing therethrough; an elongated hollow tube extending slidably through and beyond said bore so that said tube is turnable in said bore and axially movable along said bore; holding means carried by said tube and said support member at one end of the bore of the latter for holding said tube in a given angular position with respect to said support member when said holding means is engaged; a spring member located in said tube and extending outwardly beyond the latter at an end of said tube distant from said holding means; stop means carried by said spring member and cooperating with said support member for limiting the movement of said spring member in said tube along the axis of said bore toward said holding means; spring means extending between said tube and said spring member and urging said tube in that direction which engages said holding means; an adjusting element freely turnable on and axially shiftable on said tube at a portion of the latter located beyond said bore and said adjusting element having a portion extending along the part of said spring member which extends beyond said tube; clutch means cooperating with said adjusting element and said tube for fixing said adjusting element to said tube when said clutch means is engaged; a lever turnably carried by said adjusting element for turning movement with respect to the latter about an axis perpendicular to the axis of said bore; and means forming a pin-and-slot connection between said lever and spring member for producing axial shifting of said adjusting element toward said support member to engage said clutch means when said lever is turned with respect to said adjusting element in a given direction and for producing axial shifting of said spring member in a direction along said axis of said bore with respect to said support member which further tensions said spring means and which disengages said stop means from said support member for disengaging said holding means so that said tube may then be turned with respect to said support member to a different angular position with respect thereto.

9. In an assembly for adjusting the position of an enlarger head or the like, in combination, a stationary support member formed with an elongated bore passing therethrough; an elongated hollow tube extending slidably through and beyond said bore so that said tube is turnable in said bore and axially movable along said bore; holding means carried by said tube and said support member at one end of the bore of the latter and maintaining said tube in a given angular position with respect to said support member when said holding means is engaged; a spring member located in said tube and extending outwardly beyond the latter at an end of said tube distant from said holding means; stop means carried by said spring member and cooperating with said support member for limiting the movement of said spring member in said tube along the axis of said bore toward said first clutch means; spring means extending between said tube and said spring member and urging said tube in that direction which engages said holding means; an adjusting element freely turnable on and axially shiftable on said tube at a portion of the latter located beyond said bore and said adjusting element having a portion extending along the part of said spring member which extends beyond said tube; clutch means cooperating with said adjusting element and said tube for fixing said adjusting element to said tube when said clutch means is engaged; a lever turnably carried by said adjusting element for turning movement with respect to the latter about an axis perpendicular to the axis of said bore; and means forming a pin-and-slot connection between said lever and spring member for producing axial shifting of said adjusting element toward said support member to engage said clutch means when said lever is turned with respect to said adjusting element in a given direction and for producing shifting of said spring member along said axis of said bore with respect to said support member in a direction which further tensions said spring means and which disengages said stop means from said support member for disengaging said holding means so that said tube may then be turned with respect to said support member to a different angular position with respect thereto, said holding and clutch means each being in the form of a pair of frustoconical surfaces which are nested one against the other when engaged.

10. In an assembly for adjusting the position of an enlarger head or the like, in combination, a stationary support member formed with an elongated bore passing therethrough; an elongated hollow tube extending slidably through and beyond said bore so that said tube is turnable in said bore and axially movable along said bore; holding means carried by said tube and said support member at one end of the bore of the latter and maintaining said tube in a given angular position with respect to said support member when said holding means is engaged; a spring member located in said tube and extending outwardly beyond the later at an end of said tube distant from said holding means; stop means carried by said spring member and cooperating with said support member for limiting the movement of said spring member in said tube along the axis of said bore toward said holding means; spring means extending between said tube and said spring member and urging said tube in that direction which engages said holding means; an adjusting element freely turnable on and axially shiftable on said tube at a portion of the latter located beyond said bore and said adjusting element having a portion extending along the part of said spring member which extends beyond said tube; clutch means cooperating with said adjusting element and said tube for fixing said adjusting element to said tube when said clutch means is engaged; a lever turnably carried by said adjusting element for turning movement with respect to the latter about an axis perpendicular to the axis of said bore; means forming a pin-and-slot connection between said lever and spring member for producing axial shifting of said adjusting element toward said support member to engage said clutch means when said lever is turned with respect to said adjusting element in a given direction and for producing shifting of said spring member along said axis of said bore with respect to said support member in a direction which further tensions said spring means and which disengages said stop means from said support means for disengaging said holding means so that said tube may then be turned with respect to said support member to a different angular position with respect thereto; and second spring means cooperating with said support member and said adjusting element for turning the latter to a predetermined angular position with respect to the axis of said bore when said clutch means is disengaged so that said lever will be returned by said second spring means to a given position irrespective of the angular position of said tube with respect to said support member.

11. In an assembly for adjusting the position of an enlarger head or the like, in combination, a stationary support member having a pair of opposed end faces and being formed with a bore passing therethrough from one end face to the other end face thereof; an elongated tube extending slidably through said bore of said support member and extending beyond said end faces thereof; holding means cooperating with one of the end faces of said support member and with the portion of said tube extending beyond said one end face for maintaining said tube in a fixed angular position with respect to said support member when said holding means is engaged; an elongated pin located slidably within said tube and extending beyond an end thereof distant from said holding means; a stop member fixed to said pin, extending through a longitudinal slot of said tube and engaging the other end face of said support member; spring means fixed to said pin, extending along the interior of said tube, and cooperating with the end portion of the latter located beyond said one end face of said support member for urging said stop member against said other end face of said support member and for maintaining said holding means engaged; clutch means having a clutch member fixed to and surrounding said tube located adjacent said stop member but spaced at a given distance therefrom when said holding means is engaged; an adjusting element surrounding and freely slidable both angularly and axially on said tube and located next to said clutch member on the side thereof opposite from said stop member, said adjusting element carrying a second clutch member of said clutch means and said clutch means when engaged serving to fix said adjusting element to said tube; and a lever turnably carried by said adjusting element for turning movement with respect thereto about an axis perpendicular to that of said tube, said lever carrying a projection which extends into a cutout of said pin and, when said lever is turned with respect to said adjusting element, engages said pin to act as a fulcrum for said lever which then shifts said element toward said first-mentioned clutch member of said clutch means to engage the latter and then shifts said pin along the axis of said tube for disengaging said stop member from said other face of said support member and omitting pressure from said holding means for disengaging said holding means.

References Cited in the file of this patent

UNITED STATES PATENTS

| | | |
|---|---|---|
| 1,389,324 | Stevenson | Aug. 30, 1921 |
| 1,578,347 | Nicholson | Mar. 30, 1926 |
| 2,123,510 | Leitz | July 12, 1938 |

FOREIGN PATENTS

| | | |
|---|---|---|
| 686,400 | Great Britain | Jan. 21, 1953 |